United States Patent
Mannas

(10) Patent No.: US 8,655,619 B1
(45) Date of Patent: Feb. 18, 2014

(54) SYSTEM, METHOD, AND SOFTWARE FOR ESTIMATING A PEAK ACCELERATION OF AN OPTICAL SYSTEM

(75) Inventor: John R. Mannas, Dallas, TX (US)

(73) Assignee: Raytheon Company, Waltham, MA (US)

( * ) Notice: Subject to any disclaimer, the term of this patent is extended or adjusted under 35 U.S.C. 154(b) by 875 days.

(21) Appl. No.: 12/844,399

(22) Filed: Jul. 27, 2010

(51) Int. Cl.
*G01P 15/00* (2006.01)

(52) U.S. Cl.
USPC .......................... 702/141; 701/16; 73/514.01

(58) Field of Classification Search
USPC ................. 702/141; 73/514.01, 148; 701/16
See application file for complete search history.

(56) References Cited

U.S. PATENT DOCUMENTS

| | | | |
|---|---|---|---|
| 4,711,125 A | 12/1987 | Morrison | |
| 5,511,430 A * | 4/1996 | Delest et al. | 73/802 |
| 6,131,068 A | 10/2000 | Kau | |
| 6,456,939 B1 | 9/2002 | McCall et al. | |
| 6,516,283 B2 | 2/2003 | McCall et al. | |
| 6,522,992 B1 | 2/2003 | McCall et al. | |
| 6,671,648 B2 | 12/2003 | McCall et al. | |
| 7,197,928 B2 | 4/2007 | Chen et al. | |
| 7,526,402 B2 | 4/2009 | Tanenhaus et al. | |
| 7,762,133 B2 | 7/2010 | Chappell et al. | |
| 7,805,245 B2 | 9/2010 | Bacon et al. | |

| | | | |
|---|---|---|---|
| 2002/0014989 A1 * | 2/2002 | Winter et al. | 342/174 |
| 2007/0008187 A1 * | 1/2007 | Schmidt | 340/970 |
| 2007/0067678 A1 * | 3/2007 | Hosek et al. | 714/25 |
| 2008/0114506 A1 * | 5/2008 | Davis et al. | 701/16 |

FOREIGN PATENT DOCUMENTS

WO    WO 2010031179 A1 *    3/2010    .............. B64C 25/00

* cited by examiner

*Primary Examiner* — John E Breene
*Assistant Examiner* — Stephanie Bloss
(74) *Attorney, Agent, or Firm* — Pierce Atwood LLP; Joseph M. Maraia

(57) ABSTRACT

A method includes accessing a plurality of acceleration values generated by an inertial measurement unit of an optical system. The method includes identifying a maximum acceleration value (the accessed acceleration value having the greatest absolute value), identifying one or more adjacent acceleration values (the accessed acceleration value adjacent in time to the maximum acceleration value), and identifying a nearest adjacent acceleration value (the adjacent acceleration value having the value nearest the maximum acceleration value). The method includes determining a corrected peak acceleration. The corrected peak acceleration is the sum of a first value corresponding to an average of the maximum acceleration value and the nearest adjacent acceleration value and a second value corresponding to the product of a correction value and the difference between the maximum acceleration value and the nearest adjacent acceleration value. The method includes determining whether the corrected acceleration value exceeds a predefined threshold acceleration value.

27 Claims, 2 Drawing Sheets

SYSTEM, METHOD, AND SOFTWARE FOR ESTIMATING A PEAK ACCELERATION OF AN OPTICAL SYSTEM

GOVERNMENT FUNDING

A portion or all of this disclosure may have been developed with Government support under the terms of contract number W15P7T-08-D-S602 awarded by the United States Department of the Army. The U.S. Government may have certain rights in this disclosure.

TECHNICAL FIELD OF THE DISCLOSURE

This disclosure relates generally to optical systems and more particularly to a system, a method, and software for estimating a peak acceleration of an optical system.

BACKGROUND

In certain applications, optical systems, such as forward-looking infrared (FLIR) systems, are mounted to a variety of military vehicles (e.g., naval vessels, fixed-wing aircraft, helicopters, and/or armored fighting vehicles). Such systems may provide a user with increased visibility in a variety of situations. For example, such systems may detect thermal energy (which may be difficult to camouflage), allowing an operator to see in the dark, through smoke, fog, haze, and other atmospheric obscurants.

SUMMARY

According to the present disclosure, disadvantages and problems associated with previous techniques for maintaining optical system alignment may be reduced or eliminated.

In certain embodiments, a method includes accessing a plurality of acceleration values generated by an inertial measurement unit of an optical system. The method includes identifying a maximum acceleration value (the accessed acceleration value having the greatest absolute value), identifying one or more adjacent acceleration values (the accessed acceleration values adjacent in time to the maximum acceleration value), and identifying a nearest adjacent acceleration value (the adjacent acceleration value having the value nearest the maximum acceleration value). The method includes determining a corrected peak acceleration. The corrected peak acceleration is the sum of a first value corresponding to an average of the maximum acceleration value and the nearest adjacent acceleration value and a second value corresponding to the product of a correction value and the difference between the maximum acceleration value and the nearest adjacent acceleration value. The method includes determining whether the corrected acceleration value exceeds a predefined threshold acceleration value for the optical system.

Particular embodiments of the present disclosure may provide one or more technical advantages. Optical systems (e.g., FUR systems) may be mounted to a vehicle (e.g., an aircraft or other suitable vehicle) and may have an existing IMU component that is capable of measuring accelerations associated with a shock imparted on the optical system. However, the shock imparted on the optical system in certain situations (e.g., during the landing of the aircraft to which the optical system is mounted) may have a frequency that is greater than the sampling rate of the IMU. As a result, the acceleration information generated by the IMU may not accurately capture the peak acceleration experienced by the optical system. Obtaining an accurate peak acceleration, however, may be important as realignment of the optical system may be appropriate if the peak acceleration exceeds a threshold value. Certain embodiments the present disclosure may provide a technique for accurately estimating the peak acceleration experienced by an optical system (e.g., a FLIR system) as a result of a shock based on acceleration information generated by an IMU having a sampling rate less than the frequency of the shock. Accordingly, certain embodiments of the present disclosure may allow for more accurate determinations regarding when realignment of the optical system is appropriate.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DESCRIPTION OF EXAMPLE EMBODIMENTS

Figure 1:
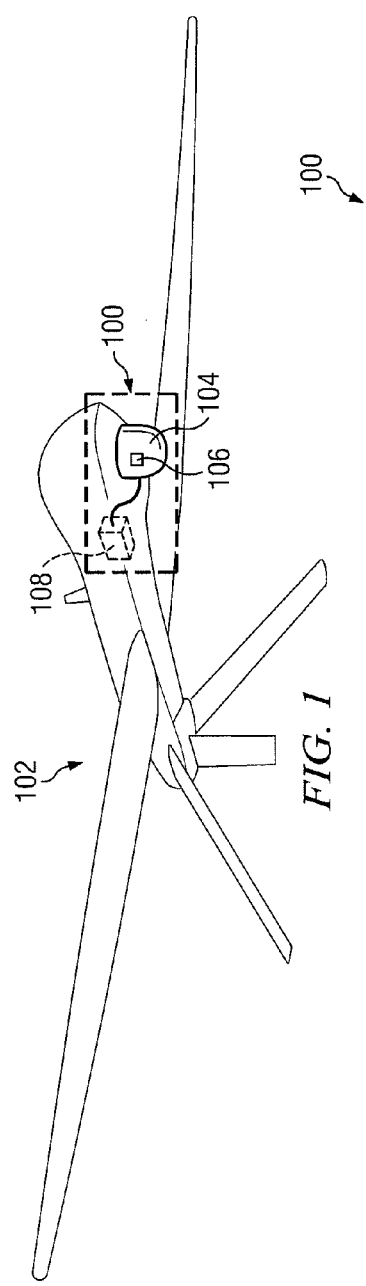
FIG. 1 illustrates an example vehicle having example components of a system for estimating a peak acceleration of an optical system, according to certain embodiments of the present disclosure.

FIG. 1 illustrates an example vehicle 102 having example components of a system 100 for estimating a peak acceleration of an optical system 104, according to certain embodiments of the present disclosure. Optical system 104 may include one or more inertial measurement units (IMU) 106, which, for simplicity, are referred to in the singular throughout the remainder of this description. System 100 may further include a controller 108 coupled to optical system 104.

In general, system 100 is operable to determine, based on acceleration information generated by IMU 106, a corrected peak acceleration experienced by optical system 104 resulting from a shock imparted on optical system 104 (e.g., a shock caused by the landing of vehicle 104). Because the sampling rate of IMU 106 may be less than the frequency of the shock imparted on optical system 104, the acceleration information generated by IMU 106 may not capture the peak acceleration experienced by optical system 104. System 100, however, may be operable to estimate the peak acceleration experienced by optical system 104 based on the acceleration information generated by IMU 106. Moreover, because realignment of optical system 104 may be appropriate if the peak acceleration of optical system 104 exceeds a threshold value, system 100 may facilitate more accurate determinations regarding when realignment is appropriate.

Although system 100 is depicted and primarily described as being implemented on a particular vehicle 102 (e.g., an unmanned aerial vehicle (UAV)), the present disclosure contemplates system 100 being implemented on any suitable vehicle. For example, system 100 may be implemented on a UAV, a manned aerial vehicle, a helicopter, a boat, a ground vehicle, or any other suitable vehicle, according to particular needs. Additionally, although system 100 is illustrated and primarily described as having particular components, the present disclosure contemplates system 100 including any suitable components, according to particular needs.

Figure 2:
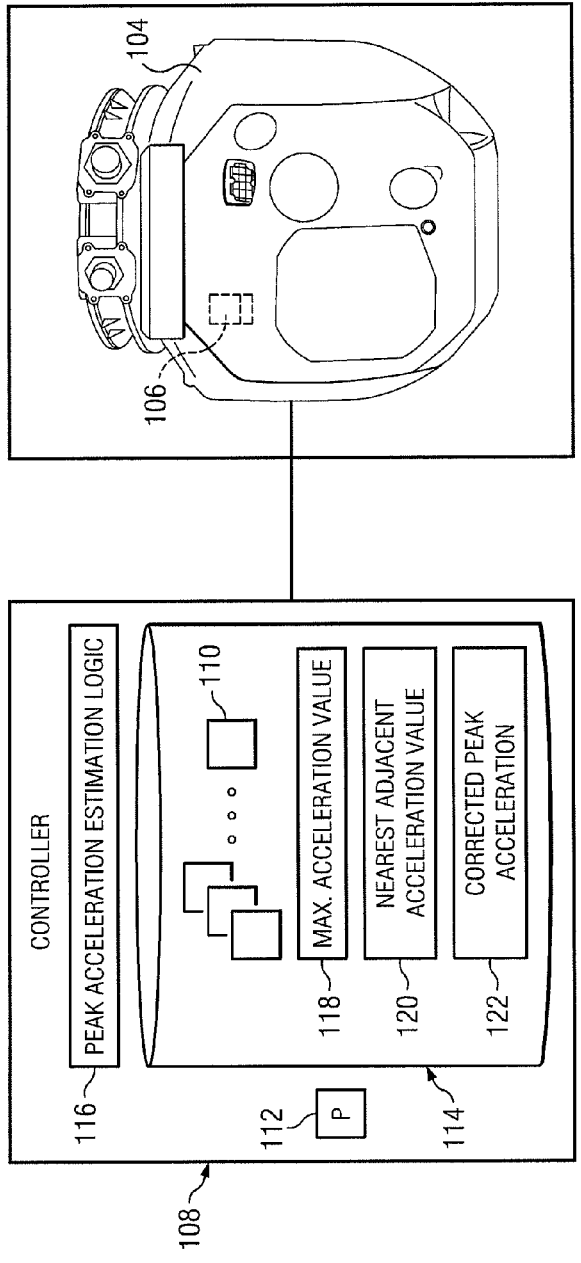
FIG. 2 illustrates an example system for estimating a peak acceleration of an optical system, according to certain embodiments of the present disclosure.

FIG. 2 illustrates an example system 100 for determining a peak acceleration of an optical system 104, according to certain embodiments of the present disclosure. As described above, system 100 may include an optical system 104, an IMU 106, and a controller 108.

Optical system 104 may include any suitable optical system configured for mounting to a vehicle 104 (e.g., a UAV). For example, optical system 104 may be a FUR system, a television camera, a rangefinder, or any other suitable avionics or other devices. As one particular example, optical system 104 may be a multispectral targeting system (MTS) (a multiuse electro-optical infrared and laser detecting-ranging-tracking set) manufactured by RAYTHEON COMPANY. Optical system 104 may include internal optics for which maintenance of precise alignment is preferred. Accordingly, in certain embodiments, alignment of the optics within optical system 104 may be adjusted if appropriate.

In certain embodiments, optical system 104 may include an IMU 106. IMU 106 may include any suitable device operable to generate acceleration information 110 associated with optical system 104. Acceleration information 110 may include a number of discrete acceleration values for optical system 104 in each of one or more directions. For example, acceleration information 110 may include a number of discrete acceleration values for optical system 104 in each of the (X), (Y), and (Z) directions. Additionally, acceleration information 110 may be generated by IMU 106 at a particular sampling rate (e.g., 60 Hz). In other words, IMU 106 may generate, for example, sixty acceleration values per second in each of the (X), (Y), and (Z) directions.

In certain embodiments, the sampling rate of IMU 106 may be less than the frequency of a shock imparted on optical system 104. Consequently, the acceleration information 110 generated by IMU 106 may not include acceleration values corresponding to the maximum acceleration experienced by optical system 104 (as the actual peak acceleration of optical system 104 may be experienced between acceleration values measured by IMU 106). As a result, controller 108 may be operable to estimate the actual peak acceleration experienced by optical system 104 by determining a corrected peak acceleration 122 based on acceleration information 110 (as described below).

In certain embodiments, IMU 106 may be communicatively coupled (e.g., via a network facilitating wireless or wireline communication) to controller 108. Controller 108 and its components may include any suitable combination of hardware, firmware, and software, and may include one or more computer systems at one or more locations. In certain embodiments, controller 108 may include one or more processing modules 112 and one or more memory modules 114 (each referred to in the singular throughout the remainder of this description). Processing module 112 may include one or more microprocessors, controllers, or any other suitable computing devices or resources and may work, either alone or with other components of system 100, to provide a portion or all of the functionality of system 100 described herein. Memory module 114 may take the form of volatile or nonvolatile memory including, without limitation, magnetic media, optical media, random access memory (RAM), read-only memory (ROM), removable media, or any other suitable memory component.

Controller 108 may be operable to receive acceleration information 110 generated by IMU 106, which may be stored in memory module 114 (or any other suitable location within system 100). As described above, acceleration information 110 may include a number of acceleration values generated by IMU 106 in each of the (X), (Y), and (Z) directions. Controller 108 may additionally include peak acceleration estimation (PAE) logic 116. PAE logic 116 may include any information, logic, and/or instructions stored and/or executed by controller 108 to determine, based on acceleration information 110 generated by IMU 106, a corrected peak acceleration value 122, the corrected peak acceleration value 122 being an estimate of the actual peak acceleration experienced by optical system 104.

For example, PAE logic 116 may access acceleration information 110 (e.g., stored in memory module 114) and, for each direction for which acceleration information 110 was generated (e.g., the (X), (Y), and (Z) directions), determine (1) a maximum acceleration value 118 generated by IMU 106, and (2) a nearest adjacent acceleration value 120 generated by IMU 106 (each of which may be stored in memory module 114). The determined maximum acceleration value 118 for a particular direction may be the acceleration value generated by IMU 106 in the particular direction that has the greatest absolute value. The determined nearest adjacent acceleration value 120 for a particular direction may be the acceleration value generated by IMU 106 in the particular direction (1) that is adjacent in time to the maximum acceleration value 118 (i.e., generated immediately before or immediately after the maximum acceleration value 118), and (2) that has the value nearest the maximum acceleration value.

Having determined the maximum acceleration value 118 and the nearest adjacent acceleration value 120 for each direction for which acceleration information was generated, PAE logic 116 may be further operable to determine a corrected peak acceleration 122 in each direction. For example, in embodiments in which IMU 106 generates acceleration information 110 for the (X), (Y), and (Z) directions, PAE logic 116 may determine a corrected peak acceleration 122 in each direction as follows:

$$CPA_X = \left| \left( \frac{MA_X + NAA_X}{2} \right) + C_X \cdot (MA_X - NAA_X) \right|$$

$$CPA_Y = \left| \left( \frac{MA_Y + NAA_Y}{2} \right) + C_Y \cdot (MA_Y - NAA_Y) \right|$$

$$CPA_Z = \left| \left( \frac{MA_Z + NAA_Z}{2} \right) + C_Z \cdot (MA_Z - NAA_Z) \right|$$

where:

$CPA_i$=corrected peak acceleration 122 in each direction $MA_i$=determined maximum acceleration value 118 in each direction $NAA_i$=determined nearest adjacent acceleration value 120 in each direction $C_i$=a constant associated with optical system 104 in each direction In certain embodiments, the constants associated with optical system 104 may be constants determined, for each direction, to reduce the standard of deviation between the determined corrected peak acceleration 122 and the actual peak acceleration experienced by optical system 104. For example, the constants may be determined by measuring (e.g., using an accelerometer) an actual acceleration of optical system 104 in each direction (such that the actual peak accelerations experienced by optical system 104 in each direction are known) and adjusting the constants such that the corrected peak accelerations 122 best approximate the actual peak accelerations.

Thus, the constants may be associated with the physical properties of a particular optical system 104.

Having determined a corrected peak acceleration 122 for each direction for which acceleration information was generated, PAE logic 116 may determine, for each direction, whether that corrected peak acceleration 122 exceeds a threshold acceleration value. In certain embodiments, the threshold acceleration value for a particular direction may be an acceleration above which realignment of optical system 104 is deemed appropriate. Thus, by determining whether a corrected peak acceleration 122 exceeds a threshold value, PAE logic 116 may be operable to determine whether realignment of optical system 104 is appropriate.

In response to determining that a corrected peak acceleration 122 exceeds a threshold value, PAE logic 116 may be operable to initiate the communication of a notification to one or more personnel associated with optical system 104. For example, PAE logic 116 may store the notification in memory module 114 such that it may be accessed by personnel responsible for maintaining alignment of optical system 104. Additionally or alternatively, PAE logic 116 may initiate the illumination of a warning light indicating that realignment of optical system 104 is appropriate, communicate a message (e.g., an email) to personnel responsible for maintaining alignment of optical system 104, or otherwise initiate the communication of a notification in any other suitable manner.

Particular embodiments of the present disclosure may provide one or more technical advantages. As discussed above, optical system 104 (e.g., a FUR system) may be mounted to a vehicle 102 (e.g., a UAV) and may have an IMU 106 that is capable of measuring accelerations associated with a shock imparted on optical system 104. However, the shock imparted on the optical system in certain situations (e.g., during the landing of the UAV to which the optical system is mounted) may have a frequency that is greater than the sampling rate of IMU 106. As a result, the acceleration information 110 generated by IMU 106 may not accurately capture the peak acceleration experienced by optical system 104. Obtaining an accurate peak acceleration, however, may be important as realignment of the optical system may be appropriate if the peak acceleration exceeds a threshold value. Accordingly, system 100 may allow for an accurate estimation of the peak acceleration experienced by optical system 104 as a result of a shock based on acceleration information 110 generated by an IMU 106 having a sampling rate less than the frequency of the shock. Accordingly, system 100 may allow for more accurate determinations regarding when realignment of optical system 104 is appropriate.

Figure 3:
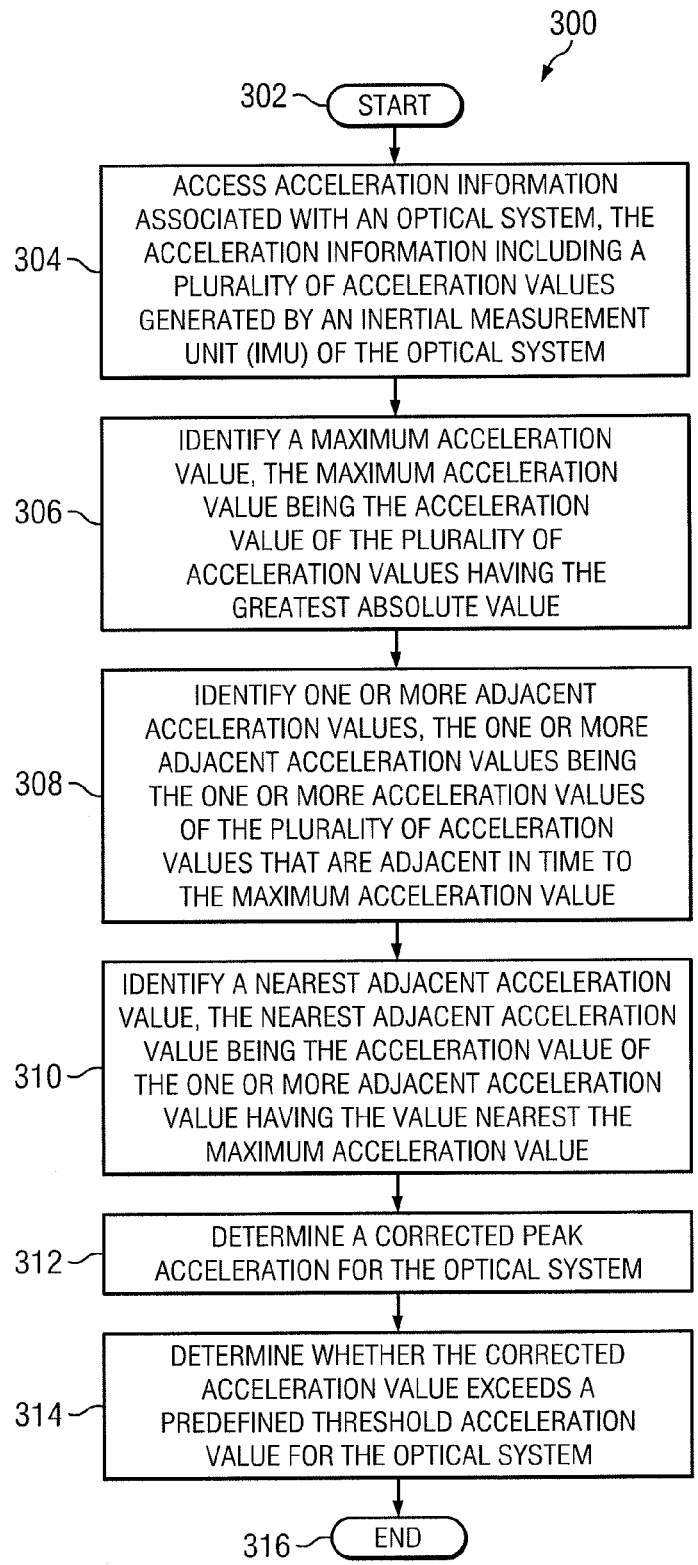
FIG. 3 illustrates an example method for estimating a peak acceleration of an optical system, according to certain embodiments of the present disclosure.

FIG. 3 illustrates an example method 300 for estimating a peak acceleration of an optical system 104, according to certain embodiments of the present disclosure. Although the present disclosure contemplates estimation of a peak accelerations in each of a number of directions (e.g., the (X), (Y), and (Z) directions), for simplicity method 300 is described with regard to estimation in a single direction.

The method begins at step 302. At step 304, PAE logic 116 of controller 108 may access acceleration information 110 associated with optical system 104. The accessed acceleration information 110 may include a number of acceleration values generated by IMU 106. At step 306, PAE logic 116 may identify a maximum acceleration value 118, the maximum acceleration value 118 being the acceleration value of the number of accessed acceleration values having the greatest absolute value. At step 308, PAE logic 116 may identify one or more adjacent acceleration values, the one or more adjacent acceleration values being the one or more acceleration values of the plurality of acceleration values that are adjacent in time to the maximum acceleration value. At step 310, PAE logic 116 may identify a nearest adjacent acceleration value 120, the nearest adjacent acceleration value 120 being the acceleration value of the one or more adjacent acceleration values having the nearest the maximum acceleration value.

At step 312, PAE logic 116 may determine a corrected peak acceleration 122 for optical system 104. As described above with regard to FIG. 2, the corrected peak acceleration value 122 may correspond to the sum of (1) a first value corresponding to an average of the maximum acceleration value 118 and the nearest adjacent acceleration value 122, and (2) a second value corresponding to the product of a correction value and the difference between the maximum acceleration value 118 and the nearest adjacent acceleration value 120. At step 314, PAE logic 116 may determine whether the corrected acceleration value 122 exceeds a predefined threshold acceleration value for optical system 104. Because the predefined threshold acceleration value for optical system 104 may be an acceleration value above which realignment of optical system 104 is deemed appropriate, the determination regarding whether the corrected acceleration value exceeds a predefined threshold acceleration may facilitate a determination regarding whether realignment of optical system 104 is appropriate. The method ends at step 316.

Although the steps of method 300 have been described as being performed in a particular order, the present disclosure contemplates that the steps of method 300 may be performed in any suitable order, according to particular needs.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A method comprising accessing acceleration information associated with an optical system, the acceleration information including a plurality of acceleration values generated by an inertial measurement unit (IMU) of the optical system;
    identifying a maximum acceleration value, the maximum acceleration value being the acceleration value of the plurality of acceleration values having the greatest absolute value;
    identifying one or more adjacent acceleration values, the one or more adjacent acceleration values being the one or more acceleration values of the plurality of acceleration values that are adjacent m time to the maximum acceleration value;
    identifying a nearest adjacent acceleration value, the nearest adjacent acceleration value being the acceleration value of the one or more adjacent acceleration value having the value nearest the maximum acceleration value;
    determining, by one or more processors, a corrected peak acceleration for the optical system, the corrected peak acceleration being the sum of:
    a first value corresponding to an average of the maximum acceleration value and the nearest adjacent acceleration value; and
    a second value corresponding to the product of a correction value and
    the difference between the maximum acceleration value and the nearest adjacent acceleration value; and determining whether the corrected acceleration value exceeds a predefined threshold acceleration value for the optical system.

2. The method of claim 1, comprising initiating, in response to determining that the corrected acceleration value exceeds the predefined threshold acceleration value for the optical system, the communication of a notification to personnel associated with the optical system.

3. The method of claim 1, wherein the predefined threshold acceleration value for the optical system corresponds to an acceleration value in response to which realignment of the optical system is deemed appropriate.

4. The method of claim 1, wherein the correction value corresponds to the physical reaction of the optical system in response to a shock imparted on the optical system.

5. The method of claim 4, wherein the correction value is a value that minimizes the standard deviation between the determined corrected peak acceleration and an actual peak acceleration of the optical system in response to the shock imparted on the optical system.

6. The method of claim 1, wherein the plurality of acceleration values generated by the IMU correspond to a shock imparted on the optical system.

7. The method of claim 6, wherein:
the IMU has an associated IMU sampling rate, the sampling rate being the rate at which the IMU generates the plurality of acceleration values;
the shock imparted on the optical system has a shock frequency; and
the IMU sampling rate is less than the shock frequency.

8. The method of claim 1, wherein the optical system is a forward-looking infrared (FLIR) system configured for mounting to a vehicle.

9. The method of claim 8, wherein:
the vehicle is a unmanned aerial vehicle (UA V); and
the plurality of acceleration values generated by the IMU correspond to a shock imparted on the FLIR system, the shock resulting from a landing of the UAV.

10. A system, comprising:
one or more memory modules operable to store acceleration information associated with an optical system, the acceleration information including a plurality of acceleration values generated by an inertial measurement unit (IMU) of the optical system; and
one or more processing modules operable to:
access the acceleration information;
identify a maximum acceleration value, the maximum acceleration value being the acceleration value of the plurality of acceleration values having the greatest absolute value;
identify one or more adjacent acceleration values, the one or more adjacent acceleration values being the one or more acceleration values of the plurality of acceleration values that are adjacent in time to the maximum acceleration value;
identify a nearest adjacent acceleration value, the nearest adjacent acceleration value being the acceleration value of the one or more adjacent acceleration value having the value nearest the maximum acceleration value;
determine a corrected peak acceleration for the optical system, the corrected peak acceleration being the sum of:
a first value corresponding to an average of the maximum acceleration value and the adjacent acceleration value; and
a second value corresponding to the product of a correction value and the difference between the maximum acceleration value and the adjacent acceleration value; and
determine whether the corrected acceleration value exceeds a predefined threshold acceleration value for the optical system.

11. The system of claim 10, wherein the one or more memory modules are operable to initiate, in response to determining that the corrected acceleration value exceeds the predefined threshold acceleration value for the optical system, the communication of a notification to personnel associated with the optical system.

12. The system of claim 10, wherein the predefined threshold acceleration value for the optical system corresponds to an acceleration value in response to which realignment of the optical system is deemed appropriate.

13. The system of claim 10, wherein the correction value corresponds to the physical reaction of the optical system in response to a shock imparted on the optical system.

14. The system of claim 13, wherein the correction value is a value that minimizes the standard deviation between the determined corrected peak acceleration and an actual peak acceleration of the optical system in response to the shock imparted on the optical system.

15. The system of claim 10, wherein the plurality of acceleration values generated by the IMU correspond to a shock imparted on the optical system.

16. The system of claim 15, wherein:
the IMU has an associated IMU sampling rate, the sampling rate being the rate at which the IMU generates the plurality of acceleration values;
the shock imparted on the optical system has a shock frequency; and
the IMU sampling rate is less than the shock frequency.

17. The system of claim 10, wherein the optical system is a forward-looking infrared (FUR) system configured for mounting to a vehicle.

18. The system of claim 17, wherein:
the vehicle is a unmanned aerial vehicle (UA V); and
the plurality of acceleration values generated by the IMU correspond to a shock imparted on the FLIR system, the shock resulting from a landing of the UAV.

19. Software embodied in a non-transitory computer-readable medium, the software operable when executed to perform operations comprising:
accessing acceleration information associated with an optical system, the acceleration information including a plurality of acceleration values generated by an inertial measurement unit (IMU) of the optical system;
identifying a maximum acceleration value, the maximum acceleration value being the acceleration value of the plurality of acceleration values having the greatest absolute value;
identifying one or more adjacent acceleration values, the one or more adjacent acceleration values being the one or more acceleration values of the plurality of acceleration values that are adjacent in time to the maximum acceleration value;
identifying a nearest adjacent acceleration value, the nearest adjacent acceleration value being the acceleration value of the one or more adjacent acceleration value having the value nearest the maximum acceleration value;
determining a corrected peak acceleration for the optical system, the corrected peak acceleration being the sum of:

a first value corresponding to an average of the maximum acceleration value and the nearest adjacent acceleration value; and a second value corresponding to the product of a correction value and the difference between the maximum acceleration value and the nearest adjacent acceleration value; and determining whether the corrected acceleration value exceeds a predefined threshold acceleration value for the optical system.

20. The software of claim 19, wherein the software is operable to perform operations comprising initiating, in response to determining that the corrected acceleration value exceeds the predefined threshold acceleration value for the optical system, the communication of a notification to personnel associated with the optical system.

21. The software of claim 19, wherein the predefined threshold acceleration value for the optical system corresponds to an acceleration value m response to which realignment of the optical system is deemed appropriate.

22. The software of claim 19, wherein the correction value corresponds to the physical reaction of the optical system in response to a shock imparted on the optical system.

23. The software of claim 22, wherein the correction value is a value that minimizes the standard deviation between the determined corrected peak acceleration and an actual peak acceleration of the optical system in response to the shock imparted on the optical system.

24. The software of claim 19, wherein the plurality of acceleration values generated by the IMU correspond to a shock imparted on the optical system.

25. The software of claim 24, wherein:
the IMU has an associated IMU sampling rate, the sampling rate being the rate at which the IMU generates the plurality of acceleration values;
the shock imparted on the optical system has a shock frequency; and
the IMU sampling rate is less than the shock frequency.

26. The software of claim 19, wherein the optical system is a forward-looking infrared (FLIR) system configured for mounting to a vehicle.

27. The software of claim 26, wherein:
the vehicle is a unmanned aerial vehicle (UAV); and
the plurality of acceleration values generated by the IMU correspond to a shock imparted on the FLIR system, the shock resulting from a landing of the UAV.

* * * * *